(12) United States Patent
Jia et al.

(10) Patent No.: US 7,349,496 B2
(45) Date of Patent: Mar. 25, 2008

(54) FAST SPACE-TIME DECODING USING SOFT DEMAPPING WITH TABLE LOOK-UP

(75) Inventors: Ming Jia, Ottawa (CA); Peiying Zhu, Kanata (CA); Wen Tong, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 780 days.

(21) Appl. No.: 10/607,860

(22) Filed: Jun. 27, 2003

(65) Prior Publication Data
US 2005/0018789 A1    Jan. 27, 2005

(51) Int. Cl.
H04L 27/06    (2006.01)
(52) U.S. Cl. ...................................... 375/341
(58) Field of Classification Search ................. 375/316, 375/340, 341
See application file for complete search history.

(56) References Cited

U.S. PATENT DOCUMENTS

| | | | |
|---|---|---|---|
| 5,968,198 A * | 10/1999 | Hassan et al. | 714/752 |
| 6,654,928 B1 * | 11/2003 | Terry et al. | 714/792 |
| 6,693,982 B1 * | 2/2004 | Naguib et al. | 375/341 |
| 2004/0066866 A1 * | 4/2004 | Tong et al. | 375/347 |

OTHER PUBLICATIONS

Stefanov et al. "Turbo-coded Modulation for Systems with Transmit and Receive Antenna Diversity Over Block Fading Channels: System Model, Decoding Approaches, and practical Considerations", IEEE Journals on Selected Areas in Communications, IEEE Inc. New York, vol. 19, No. 5, May 2001 (pp. 958-968).*

* cited by examiner

*Primary Examiner*—Kevin Burd
(74) *Attorney, Agent, or Firm*—Withrow & Terranova, PLLC

(57) ABSTRACT

From potential symbol combinations transmitted from a transmitter, Euclidean distances between the received signals and the symbol vectors are determined in light of the corresponding channel responses and stored in a Euclidean distance table, from which the smallest Euclidean distance is selected as a hard decision. The hard decision is used to find a bit vector corresponding to the estimated symbol vector associated with the hard decision. For each bit in the bit vector, a reduced Euclidean distance table is created to include only Euclidean distances associated with a competing bit associated with the hard decision. The minimum Euclidean distance from each reduced Euclidean distance table becomes a soft demapping decision for a corresponding bit. Log likelihood ratios for each bit are determined by the difference between the hard decision and respective soft demapping decisions. The differences are provided to a channel decoder to recover the originally transmitted bits.

36 Claims, 10 Drawing Sheets

- POSSIBLE POINTS IN A 16 QAM CONSTELLATION
* RECEIVED SYMBOL BASE ON SEPARATE DETECTION SOLUTION
⊙ ACTUAL SYMBOL TRANSMITTED

RX-1 SUBSET

RX-2 SUBSET

RX-3 SUBSET

RX-4 SUBSET

• COMBINED POINTS FROM TRANSMIT ANTENNAS
* RECEIVED SYMBOL
⊙ TRANSMITTED SYMBOL

FAST SPACE-TIME DECODING USING SOFT DEMAPPING WITH TABLE LOOK-UP

FIELD OF THE INVENTION

The present invention relates to wireless communications, and in particular to decoding techniques in a wireless communication system.

BACKGROUND OF THE INVENTION

Interference and fading are significant impediments to achieving high data rates in today's wireless communication systems. Given the tendency for channel conditions to sporadically and significantly fade, communication resources are conservatively allocated, leaving excessive amounts of communication resources unused most of the time. Efforts to combat the impact of fading include incorporating transmission diversity or controlling modulation and coding techniques in relation to channel conditions.

Spatial diversity is typically a function of the number and placement of transmit and receive antennas relative to a transmitter and receiver. Systems employing spatial diversity with multiple transmit and receive antennas are generally referred to as multiple-input multiple-output (MIMO) systems. Accordingly, a transmitting device will have M transmit antennas, and the receiving device will have N receive antennas. Space-time coding (STC) controls what data is transmitted from each of the M transmit antennas. A space-time encoding function at the transmitter processes data to be transmitted and creates unique information to transmit from the M transmit antennas. Each of the N receive antennas will receive signals transmitted from each of the M transmit antennas. A space-time decoding function at the receiving device will combine the information sent from the M transmit antennas to recover the data.

Space-time coding is typically implemented using one of two techniques. The first technique encodes the same data in different formats for transmission from the different transmit antennas. Thus, the same data is transmitted in different formats from each of the M transmit antennas. The second technique transmits different data from different ones of the M transmit antennas, wherein the redundancy of the second technique is avoided. The first technique, space-time transmit diversity (STTD), is effective in maximizing diversity but inefficient due to the requisite redundancy. The second technique, which is often referred to as V-BLAST (Vertical-Bell Laboratories Layered Space Time), increases system throughput for systems having sufficient diversity available. Once a threshold amount of diversity is achieved, data rates increase linearly with the number of transmit and receive antennas for BLAST systems, whereas additional spatial diversity has little impact on data rates in STTD systems. Further information related to STTD and BLAST can be found in Siavash M. Alamouti, "A Simple Transmit Diversity Technique for Wireless Communications," IEEE J. Select. Areas Commun., vol. 16, pp. 1451-1458, Oct. 1998; G. J. Foschini, "Layered Space-time Architecture for Wireless Communications in a Fading Environment when Using Multi-element antennas," Bell Labs Tech. J., pp. 41-59, Autumn 1996; G. D. Golden, G. J. Foschini, R. A. Valenzuela, and P. W. Wolniansky, "Detection Algorithm and Initial Laboratory Results Using V-BLAST Space-time Communication Architecture," Electronics Letters, vol. 35, pp. 14-16, Jan. 1999; and P. W. Wolniansky, G. J., Foschini, G. D. Golden, and R. A. Valenzuela, "V-BLAST: An Architecture for Realizing Very High Data Rates Over the Rich-scattering Wireless Channel," Proc. IEEE ISSSE-98, Pisa, Italy, Sept. 1998, pp. 295-300, which are incorporated herein by reference.

Prior to implementing space-time coding, data to be transmitted is normally encoded to facilitate error correction, and modulated or mapped into symbols using any number of available modulation techniques, such as quadrature phase shift keying (QPSK) and x-quadrature amplitude modulation (QAM). The type of encoding for error correction and modulation techniques greatly influences the data rates, and their applicability is often a function of channel conditions.

In general, BLAST-type STC decoding techniques are defined as providing either joint or separate detection For joint detection, to detect a signal from one antenna, the signals transmitted by all of the other antennas must also be considered. In essence, the signals are detected as a set, not on an individual basis as is done with separate detection techniques. The optimum algorithm to facilitate BLAST decoding is maximum likelihood decoding (MLD), which is a joint detection technique. MLD obtains a diversity order equal to the number of receive antennas, independent of the number of transmit antennas. Hence, compared to other techniques, MLD has a significant signal-to-noise ratio (SNR) advantage, and the SNR gain grows with the number of transmit antennas. One disadvantage of MLD is that its complexity grows exponentially with the number of transmit antennas. As such, the predominant decoding techniques for BLAST implement separate detection and use minimum mean square error (MMSE) or zero-forcing (ZF), which are both significantly less complex than MLD techniques.

In operation, a ZF V-BLAST decoder operates to invert the MIMO channel and solve the information transmitted from M transmit antennas. Suppose the MIMO channel input is denoted as vector:

$$x = [x_1 x_2 \ldots x_M]^T, \quad \text{Equation 1}$$

the MIMO channel output is denoted as:

$$y = [y_1 y_2 \ldots y_N]^T, \quad \text{Equation 2 and}$$

the MIMO channel noise is denoted as:

$$n = [n_1 n_2 \ldots n_N]^T. \quad \text{Equation 3}$$

In the presence of noise, the V-BLAST decoder input can be represented as:

$$y = H_{N \times M} x + n. \quad \text{Equation 4}$$

The V-BLAST decoder performs MIMO channel estimation H, then the direct MIMO channel inversion leads to a zero-forcing solution, which is represented as:

$$\hat{x} = (H'H)^{-1} H' y,$$
$$= x + \varepsilon \quad \text{Equation 5}$$

where $\hat{x}$ is the detected signal vector of x, and $\varepsilon = -(H'H)^{-1} H'n$ is the detection noise. Notably, in the derivation of Equation 5, perfect channel information is assumed; thus when $n = 0$, $\varepsilon = 0$.

When making hard-decision symbol estimates, the Euclidean distances between each detected signal can be represented as $$\{\hat{x}_i|_{i=1,\ldots M}\},$$

which is represented as a point in a constellation, and all the possible signal candidates from a particular antenna, which are represented as several points in a constellation lattice, are calculated. Next, the candidate signal with the minimum distance to the detected signal is deemed to be the signal transmitted. Note that the detection process for each antenna is unrelated to signals transmitted from the other antennas. The same is true for soft-decision bit demapping. For instance, the sign and value of each soft bit demapped from the signal transmitted by the antenna $Tx_i$ are determined by $\hat{x}_i$ only, and are unrelated to $$\{\hat{x}_j|_{j\neq i}\}.$$

As noted above, MLD takes a joint detection approach. To detect which signal has been transmitted by antenna $Tx_i$, the decoder must consider signals transmitted by all the other antennas. As such, the signals are detected as a set. The maximum likelihood estimate of a signal vector x is given by:

$$\hat{x}=\arg\min\|r-Hx\|, \quad \text{Equation 6}$$

where x is the signal vector given in Equation 1, with $x_i \in \{s_1, s_2, \ldots, s_q\}$ and $q=2^{n_b}$ being the constellation size. As shown from Equation 6, the detection is based on the Euclidean distance between received signal vector r and $q^M$ different candidate vectors Hx, where M is the number of transmit antennas.

The maximum likelihood estimate of a received signal vector is given by Equation 6, which expands the candidate signal constellation from one dimension to M dimensions. Accordingly, the complexity grows exponentially with the number of transmit antennas. With separate detection, the Euclidean distance calculation is always carried out in one dimension only:

$$\hat{x}_i=\arg\min\|\hat{x}_i-x_i\|. \quad \text{Equation 7}$$

Accordingly, the computational complexity of V-BLAST detection for separate detection techniques, such as ZF or MMSE, is linear with respect to the number of transmit antennas. However, the limitation for the separate detection techniques is twofold. First, the number of receiver antennas should be larger than the number of transmit antennas. Second, the diversity order with respect to the system performance is N−M+1. In contrast, the advantages of joint detection are that the diversity order for the MLD decoder is linear with the number of transmit antennas, and the number of receive antennas can be less than the number of transmit antennas. However, the disadvantage of the joint detection is that the complexity of the MLD decoder is exponential to the number of transmit antennas. Accordingly, there is a need for a technique to minimize the complexity and computational intensity of MLD decoding. There is a further need for a decoding technique capable of taking advantage of the benefits of both joint and separate decoding while minimizing limitations. In particular, there is a need for the precision of MLD detection with the complexity closer to ZF or MMSE detection.

Further reference is made to Richard van Nee, Allert van Zelst and Geert Awater, "Maximum Likelihood Decoding in a Space Division Multiplexing System," IEEE VTC 2000, Tokyo, Japan, May 2000, and Andrej Stefanov and Tolga M. Duman, "Turbo-coded Modulation for Systems with Transmit and Receive Antenna Diversity over Block Fading Channels: System Model, Decoding Approaches, and Practical Considerations," IEEE *J. Select. Areas Commun.*, vol. 19, pp. 958-968, May, 2001, and co-assigned U.S. patent application Ser. No. 10/263,268 filed Oct. 2, 2002, which are incorporated herein by reference.

SUMMARY OF THE INVENTION

The present invention provides efficient Maximum Likelihood Decoding. Each symbol vector $\vec{s}$ is associated with a unique combination of symbols, $s_i$, which may be simultaneously transmitted from a transmitter's multiple antennas. A predetermined symbol vector table provides all or a portion of the potential symbol combinations that may be transmitted from the transmitter, wherein each combination is stored as a symbol vector, $\vec{s}$. Euclidean distances are calculated between the received signals r and the symbol vectors $\vec{s}$ from the predetermined symbol vector table in light of the corresponding channel responses, H, and the Euclidean distances are stored in a Euclidean distance table.

From the Euclidean distance table, the smallest Euclidean distance is selected as a hard decision. The hard decision is used to select an estimated symbol vector ($\vec{\hat{s}}$) from the corresponding predetermined symbol vector table. The estimated symbol vector is the symbol vector from the predetermined symbol vector table from which the hard decision was calculated. From the estimated symbol vector, an estimated bit vector ($\vec{\hat{b}}$) is selected or otherwise determined.

For each bit in the bit vector, a reduced Euclidean distance table is created. The Euclidean distances in the reduced Euclidean distance table represent Euclidean distances associated with a competing bit associated with the hard decision. The minimum Euclidean distance from each reduced Euclidean distance table is selected as a soft demapping decision for a corresponding bit. Thus, if the first bit in the bit vector is a 0, the Euclidean distances selected from the Euclidean distance table will be those where the first bit associated with the Euclidean distances is a 1. Next, Log likelihood ratios for each bit are calculated by finding the difference between the hard decision and respective soft demapping decisions. The differences are provided to a channel decoder to recover the originally transmitted bits.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
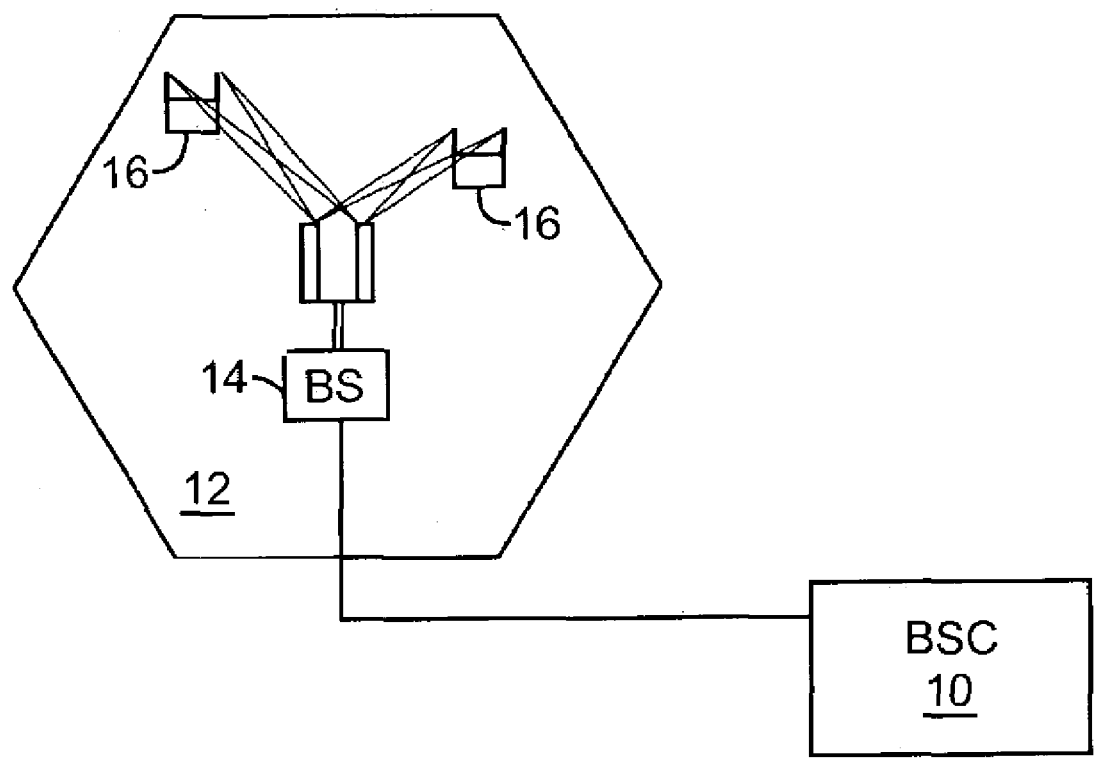
FIG. 1 is a block representation of a wireless communication system according to one embodiment of the present invention.

With reference to FIG. 1, a basic wireless communication environment is illustrated. In general, a base station controller (BSC) 10 controls wireless communications within multiple cells 12, which are served by corresponding base stations (BS) 14. Each base station 14 facilitates communications with mobile terminals 16, which are within the cell 12 associated with the corresponding base station 14. For the present invention, the base stations 14 and mobile terminals 16 include multiple antennas to provide spatial diversity for communications.

Figure 2:
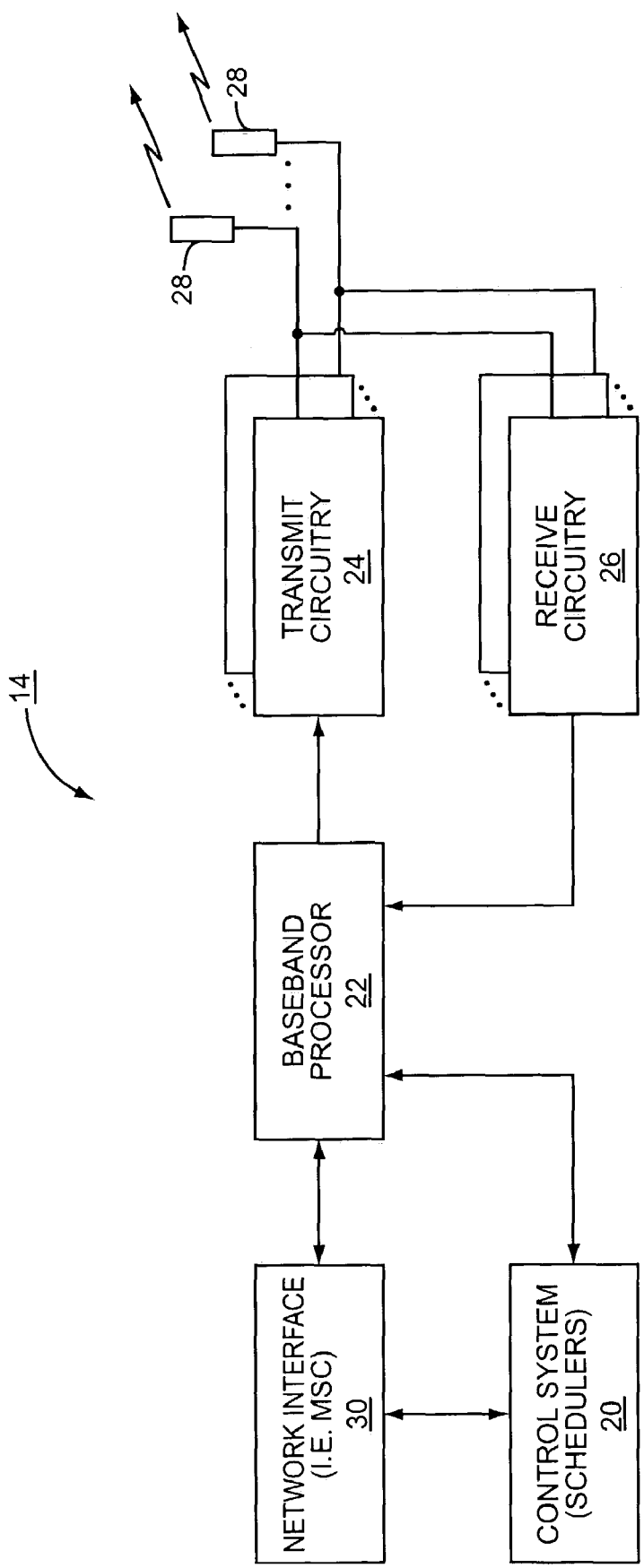
FIG. 2 is a block representation of a base station according to one embodiment of the present invention.

With reference to FIG. 2, a base station 14 configured according to one embodiment of the present invention is illustrated. The base station 14 generally includes a control system 20, a baseband processor 22, transmit circuitry 24, receive circuitry 26, multiple antennas 28, and a network interface 30. The receive circuitry 26 receives radio frequency signals through antennas 28 bearing information from one or more remote transmitters provided by mobile terminals 16. Preferably, a low noise amplifier and a filter (not shown) cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 22 processes the digitized received signal to extract the information or data bits conveyed in the received-signal. This processing typically comprises demodulation, decoding, and error correction operations. As such, the baseband processor 22 is generally implemented in one or more digital signal processors (DSPs). The received information is then sent across a wireless network via the network interface 30 or transmitted to another mobile terminal 16 serviced by the base station 14. The network interface 30 will typically interact with the base station controller 10 and a circuit-switched network forming a part of a wireless network, which may be coupled to the public switched telephone network (PSTN).

On the transmit side, the baseband processor 22 receives digitized data, which may represent voice, data, or control information, from the network interface 30 under the control of control system 20, and encodes the data for transmission. The encoded data is output to the transmit circuitry 24, where it is modulated by a carrier signal having a desired transmit frequency or frequencies. A power amplifier (not shown) will amplify the modulated carrier signal to a level appropriate for transmission, and deliver the modulated carrier signal to the antennas 28 through a matching network (not shown). The multiple antennas 28 and the replicated transmit and receive circuitries 24, 26 provide spatial diversity. Modulation and processing details are described in greater detail below.

Figure 3:
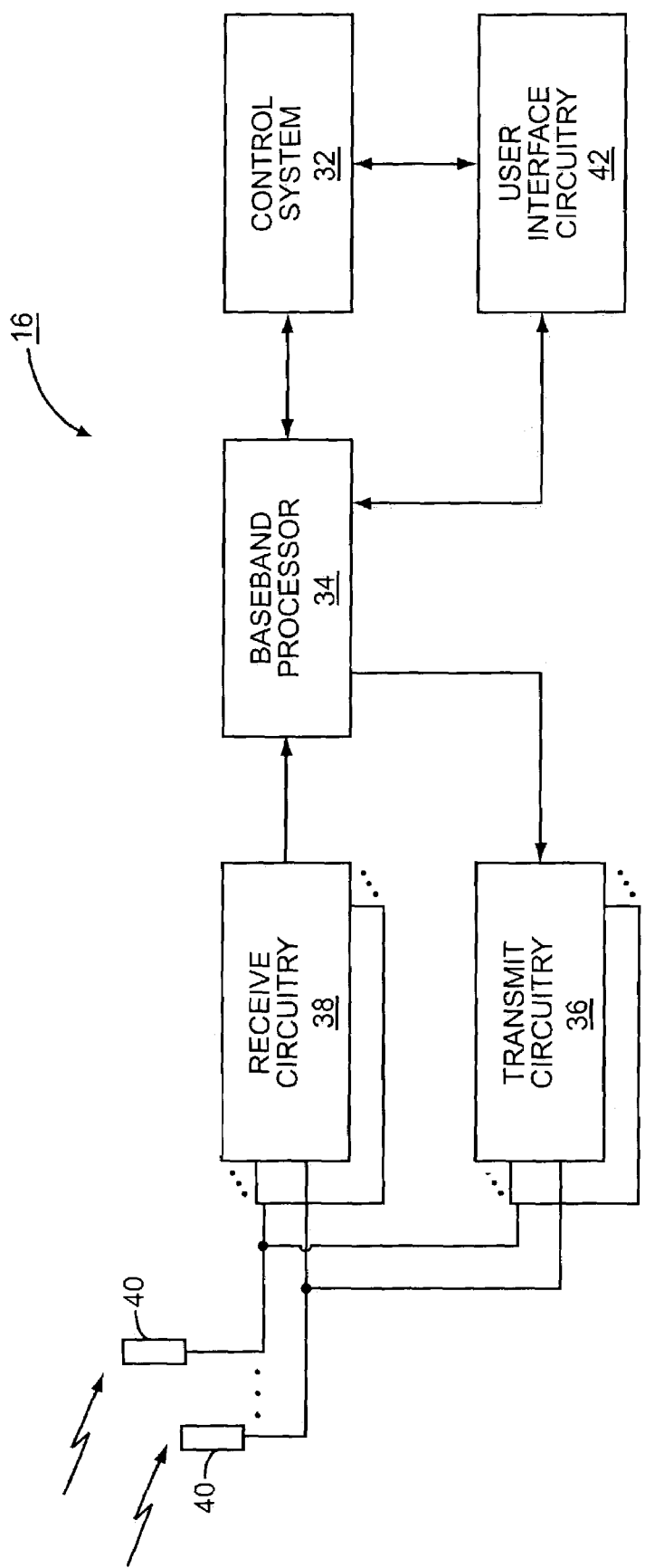
FIG. 3 is a block representation of a mobile terminal according to one embodiment of the present invention.

With reference to FIG. 3, a mobile terminal 16 configured according to one embodiment of the present invention is illustrated. Similarly to the base station 14, the mobile terminal 16 will include a control system 32, a baseband processor 34, transmit circuitry 36, receive circuitry 38, multiple antennas 40, and user interface circuitry 42. The receive circuitry 38 receives radio frequency signals through antennas 40 bearing information from one or more base stations 14. Preferably, a low noise amplifier and a filter (not shown) cooperate to amplify and remove broadband interference from the signal for processing. Downconversion and digitization circuitry (not shown) will then downconvert the filtered, received signal to an intermediate or baseband frequency signal, which is then digitized into one or more digital streams. The baseband processor 34 processes the digitized received signal to extract the information or data bits conveyed in the received signal. This processing typically comprises demodulation, decoding, and error correction operations, as will be discussed in greater detail below. The baseband processor 34 is generally implemented in one or more digital signal processors (DSPs) and application specific integrated circuits (ASICs).

For transmission, the baseband processor 34 receives digitized data, which may represent voice, data, or control information, from the control system 32, which it encodes for transmission. The encoded data is output to the transmit circuitry 36, where it is used by a modulator to modulate a carrier signal that is at a desired transmit frequency or frequencies. A power amplifier (not shown) will amplify the modulated carrier signal to a level appropriate for transmission, and deliver the modulated carrier signal to the antennas 40 through a matching network (not shown). The multiple antennas 40 and the replicated transmit and receive circuitries 36, 38 provide spatial diversity. Modulation and processing details are described in greater detail below.

Figure 4:
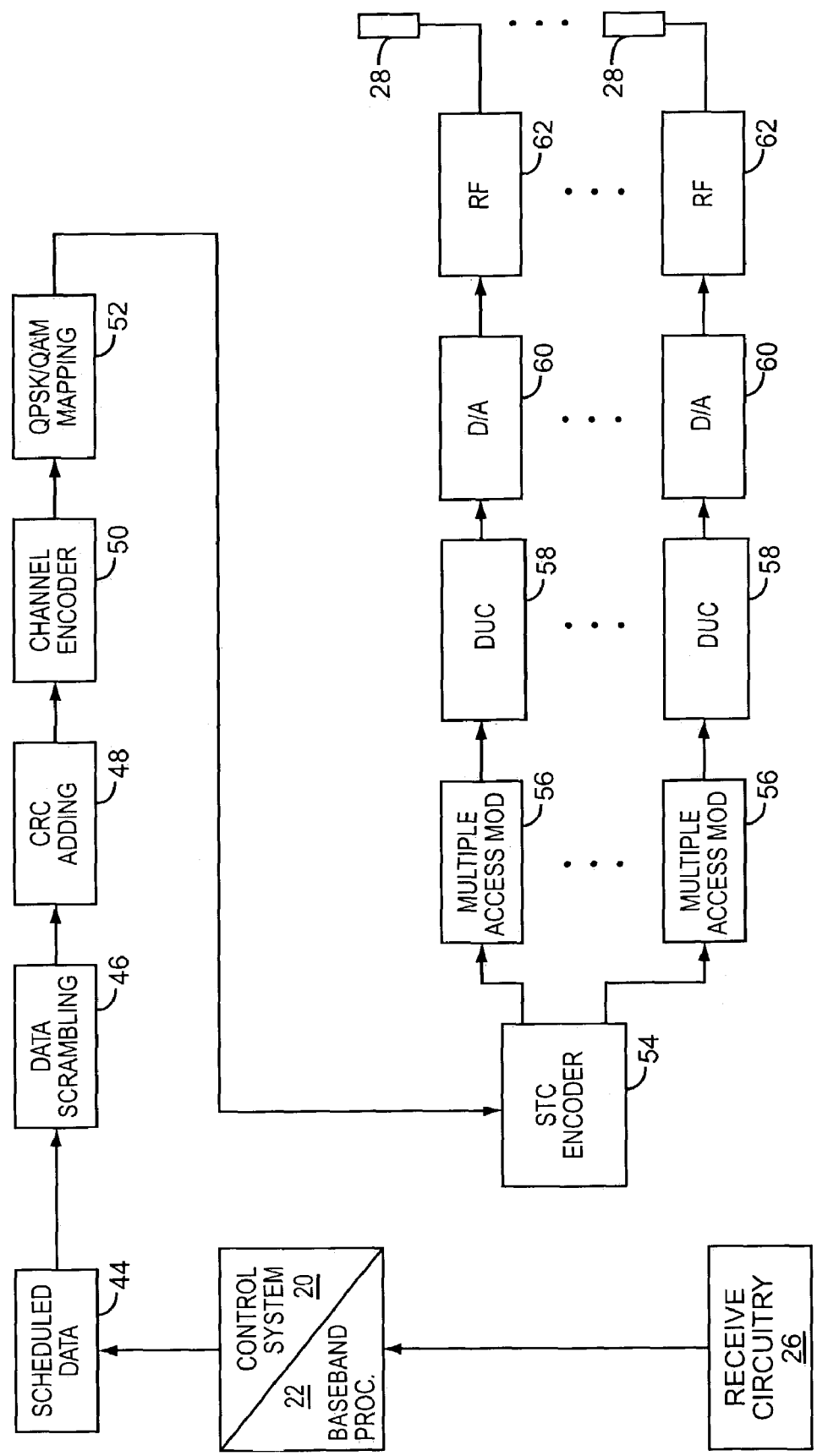
FIG. 4 is a logical breakdown of a transmitter architecture according to one embodiment of the present invention.

With reference to FIG. 4, a logical transmission architecture is provided according to one embodiment. The transmission architecture is described as being that of the base station 14, but those skilled in the art will recognize the applicability of the illustrated architecture for both uplink and downlink communications. Further, the transmission architecture is intended to represent a variety of multiple access architectures, including, but not limited to code division multiple access (CDMA), frequency division multiple access (FDMA), time division multiple access (TDMA), and orthogonal frequency division multiplexing (OFDM).

Initially, the base station controller 10 sends data intended for a mobile terminal 16 to the base station 14 for scheduling. The scheduled data 44, which is a stream of bits, is scrambled in a manner reducing the peak-to-average power ratio associated with the data using data scrambling logic 46. A cyclic redundancy check (CRC) for the scrambled data is determined and appended to the scrambled data using CRC adding logic 48. Next, channel coding is performed using channel encoder logic 50 to effectively add redundancy to the data to facilitate recovery and error correction at the mobile terminal 16. The channel encoder logic 50 uses known Turbo encoding techniques in one embodiment.

The resultant data bits are systematically mapped into corresponding symbols depending on the chosen baseband modulation by mapping logic 52. Preferably, a form of Quadrature Amplitude Modulation (QAM) or Quadrature Phase Shift Key (QPSK) modulation is used. At this point, groups of bits have been mapped into symbols representing locations in an amplitude and phase constellation. Blocks of symbols are then processed by space-time code (STC) encoder logic 54. The STC encoder logic 54 will process the incoming symbols according to a selected STC encoding mode and provide N outputs corresponding to the number of transmit antennas 28 for the base station 14. At this point, assume the symbols for the N outputs are representative of the data to be transmitted and capable of being recovered by the mobile terminal 16. Further detail is provided in A. F. Naguib, N. Seshadri, and A. R. Calderbank, "Applications of space-time codes and interference suppression for high capacity and high data rate wireless systems," Thirty-Second Asilomar Conference on Signals, Systems & Computers, Volume 2, pp. 1803-1810, 1998; R. van Nee, A. van Zelst and G. A. Atwater, "Maximum Likelihood Decoding in a Space Division Multiplex System", IEEE VTC. 2000, pp. 6-10, Tokyo, Japan, May 2000; and P. W. Wolniansky et al., "V-BLAST: An Architecture for Realizing Very High Data Rates over the Rich-Scattering Wireless Channel," Proc. IEEE ISSSE-98, Pisa, Italy, Sep. 30, 1998 which are incorporated herein by reference in their entireties.

For illustration, assume the base station 14 has two antennas 28 (N=2) and the STC encoder logic 54 provides two output streams of symbols. Accordingly, each of the symbol streams output by the STC encoder logic 54 is sent to a corresponding multiple access modulation function 56, illustrated separately for ease of understanding. Those skilled in the art will recognize that one or more processors may be used to provide such analog or digital signal processing alone or in combination with other processing described herein. For example, the multiple access modulation function 56 in a CDMA function would provide the requisite PN code multiplication, wherein an OFDM function would operate on the respective symbols using inverse discrete Fourier transform (IDFT) or like processing to effect an Inverse Fourier Transform. Attention is drawn to co-assigned application Ser. No. 10/104,399, filed Mar. 22, 2002, entitled SOFT HANDOFF FOR OFDM, for additional OFDM details, and to RF Microelectronics by Behzad Razavi, 1998 for CDMA and other multiple access technologies, both of which are incorporated herein by reference in their entirety.

Each of the resultant signals is up-converted in the digital domain to an intermediate frequency and converted to an analog signal via the corresponding digital up-conversion (DUC) circuitry 58 and digital-to-analog (D/A) conversion circuitry 60. The resultant analog signals are then simultaneously modulated at the desired RF frequency, amplified, and transmitted via RF circuitry 62 and antennas 28. Notably, the transmitted data may be preceded by pilot signals, which are known by the intended mobile terminal 16. The mobile terminal 16, which is discussed in detail below, may use the pilot signals for channel estimation and interference suppression and the header for identification of the base station 14.

Figure 5:
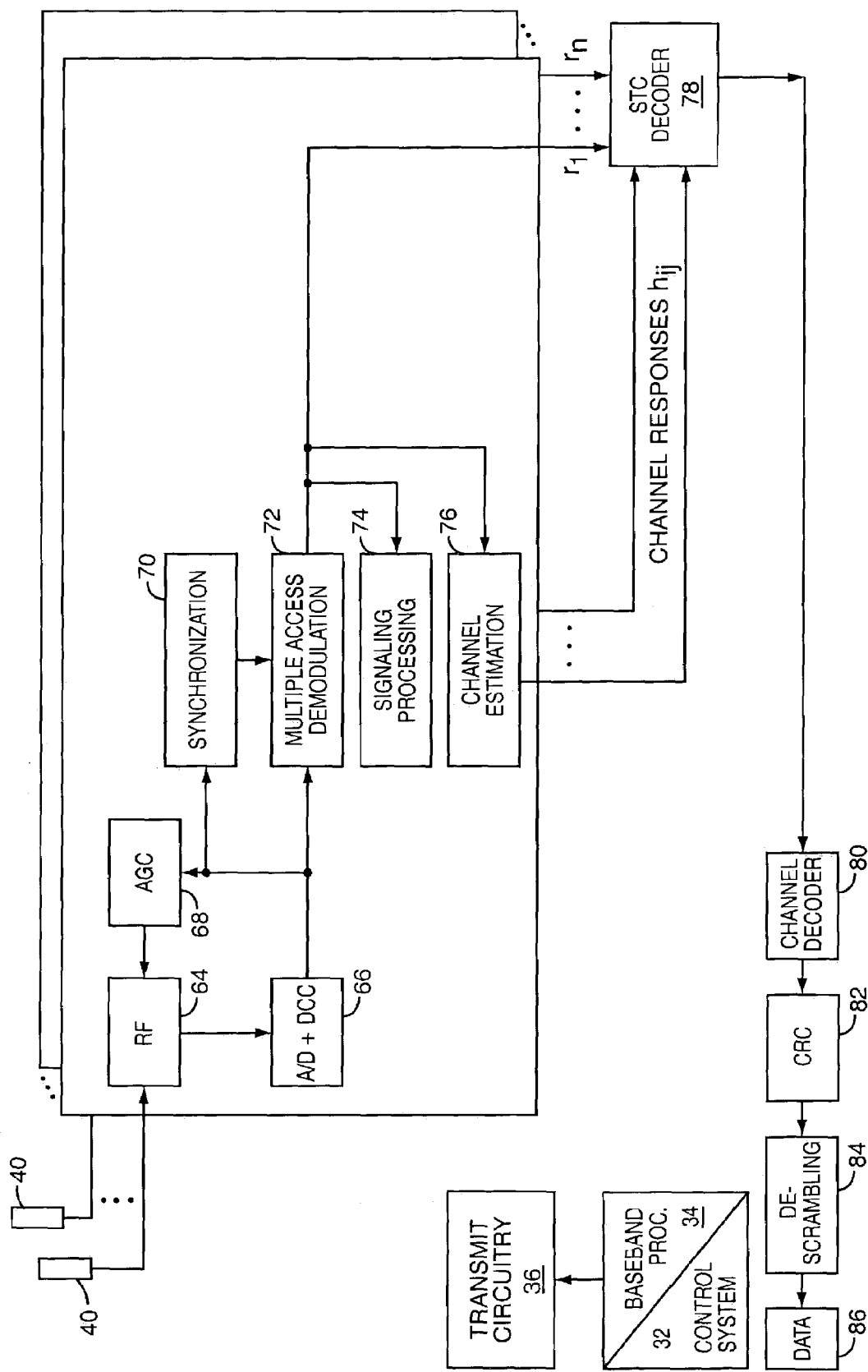
FIG. 5 is a logical breakdown of a receiver architecture according to one embodiment of the present invention.

Reference is now made to FIG. 5 to illustrate reception of the transmitted signals by a mobile terminal 16. Upon arrival of the transmitted signals at each of the antennas 40 of the mobile terminal 16, the respective signals are demodulated and amplified by corresponding RF circuitry 64. For the sake of conciseness and clarity, only one of the multiple receive paths in the receiver is described and illustrated in detail. Analog-to-digital (A/D) conversion and downconversion circuitry (DCC) 66 digitizes and downconverts the analog signal for digital processing. The resultant digitized signal may be used by automatic gain control circuitry (AGC) 68 to control the gain of the amplifiers in the RF circuitry 64 based on the received signal level.

The digitized signal is also fed to synchronization circuitry 70 and a multiple access demodulation function 72, which will recover the incoming signal received at a corresponding antenna 40 at each receiver path. The synchronization circuitry 70 facilitates alignment or correlation of the incoming signal with the multiple access demodulation function 72 to aid recovery of the incoming signal, which is provided to a signaling processing function 74 and channel estimation function 76. The signaling processing function 74 processes basic signaling and header information to provide information sufficient to generate a channel quality measurement, which may bear on an overall signal-to-noise ratio for the link, which takes into account channel conditions and/or signal-to-noise ratios for each receive path.

The channel estimation function 76 for each receive path provides channel responses ($h_{i,j}$) corresponding to channel conditions for use by an STC decoder 78. The symbols from the incoming signal and channel estimates for each receive path are provided to the STC decoder 78, which provides STC decoding on each receive path to recover the transmitted symbols. The channel estimates provide sufficient channel response information to allow the STC decoder 78 to decode the symbols according to the STC encoding used by the base station 14 and recover estimates corresponding to the transmitted bits. In a preferred embodiment, the STC decoder 78 implements Maximum Likelihood Decoding (MLD) for BLAST-based transmissions. As such, the outputs of the STC decoder 78 are log likelihood ratios (LLRs) for each of the transmitted bits, as will be described below in greater detail. These estimates, such as the LLRs, are then presented to channel decoder logic 80 to recover the initially scrambled data and the CRC checksum. The channel decoder logic 80 will preferably use Turbo decoding. Accordingly, CRC logic 82 removes the CRC checksum, checks the scrambled data in traditional fashion, and provides it to the de-scrambling logic 84 for de-scrambling using the known base station de-scrambling code to recover the originally transmitted data 104.

Figure 6:
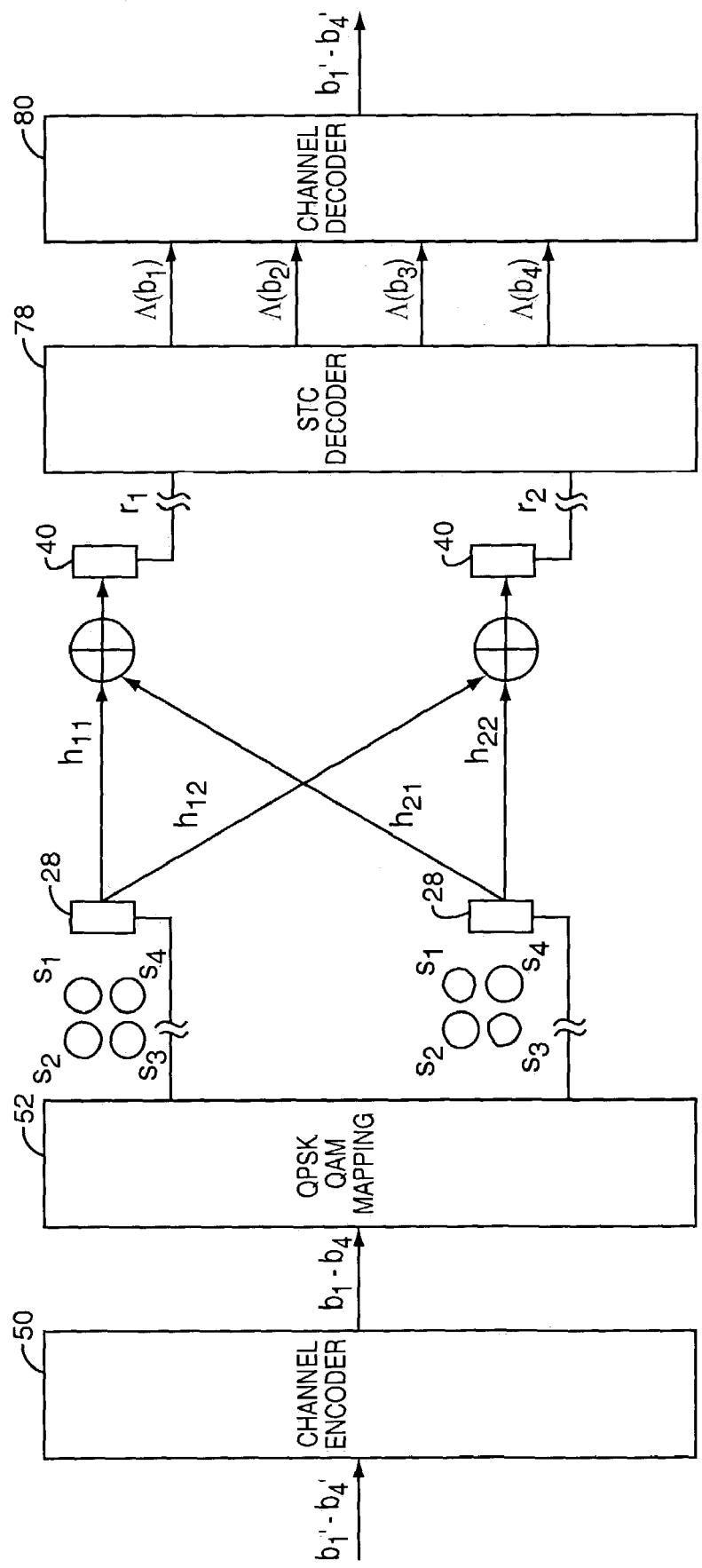
FIG. 6 is a limited block representation of a communication environment according to one embodiment of the present invention.

The following describes the present invention and refers to the primary device used for transmission as the transmitter and the device used for receiving as the receiver. At any given time depending on the direction of primary communications, the base station 14 and the mobile terminals 16 may be a transmitter, receiver, or both. As noted above, the essence of the invention lies in the STC decoder 78. With reference to FIG. 6, an abbreviated block representation of a transmitter and receiver is provided to assist in the following description of the preferred STC decoding techniques. In general, the transmitter and receiver provide a multiple input multiple output (MIMO) system, wherein data bits to be transmitted ($b_1'$-$b_4'$) are encoded using Turbo encoding techniques by the channel encoder 50 and the resultant bits, $b_1$-$b_4$, are presented to the QPSK/QAM mapping function 52 and mapped into appropriate symbols to be transmitted from the multiple antennas 28 to facilitate BLAST-type transmissions of the various symbols.

The signals transmitted from each of the antennas 28 essentially superimpose onto one another, and are collectively received at each of the receiver's antennas 40. The extent and effect of such superimposition of the signals is a function of the corresponding channel responses, $h_{i,j}$. The received signals, $r_i$, from each antenna 40 are composite signals representing the superposition of the signals transmitted from each of the transmitter's antennas 28 in light of the corresponding channel responses. The received signals $r_i$ are respectively provided to the STC decoder 78, which will preferably provide MLD decoding to recover the LLRs for the corresponding encoded bits, $b_1$-$b_4$, and provide them to the channel decoder 80, which will decode the LLRs, $\Lambda(b_1)$ through $\Lambda(b_4)$, using Turbo decoding to recover the original data bits $b_1'$-$b_4'$. Please note that this exemplary system is a QPSK-based system with two transmit antennas 28 and two receive antennas 40.

In the M×N MIMO system of FIG. 6, the channel matrix of channel responses is defined as:

$$H = \begin{bmatrix} h_{11} & h_{12} & \cdots & h_{1M} \\ h_{21} & h_{22} & \cdots & h_{2M} \\ \vdots & \vdots & \ddots & \vdots \\ h_{N1} & h_{N2} & \cdots & h_{NM} \end{bmatrix}.$$

Equation 8

Accordingly, the received signal vector $\vec{r}$, which represents each of the received signals, $r_i$, can be expressed as:

$$\vec{r} = H\vec{s} + \vec{n},$$

Equation 9 where $\vec{s}$ is a symbol vector that represents the transmitted symbols $s_j$; $\vec{n}$ is a noise vector that represents noise components associated with the transmitted symbols $s_j$; and $$\vec{r} = [r_1 \; r_2 \; \cdots \; r_N]^T$$

$$\vec{s} = [s_1 \; s_2 \; \cdots \; s_M]^T$$

$$\vec{n} = [n_1 \; n_2 \; \cdots \; n_M]^T.$$

Equation 10

If the size of the constellation is $2^q$, then the received signals of the signal vector, $\vec{r}$, correspond to qM coded bits. Soft-demapping is used to compute the LLR of each of these qM bits using $\vec{r}$.

The qM bits that construct $\vec{s}$ are denoted by the bit vector:

$$\vec{b} = [b_1 \ldots b_q b_{q+1} \ldots b_{qM}].$$

Equation 11

The LLR for the lth element of bit vector $\vec{b}$, b1, is given by:

$$\Lambda(b_1) = \log \frac{Pr[b_1 = 1 \mid \vec{r}]}{Pr[b_1 = 0 \mid \vec{r}]},$$

Equation 12 which, by substituting for the noise statistics, can be further expressed as:

$$\Lambda(b_1) = \log \frac{\sum_{\vec{s}=f(\vec{b}), b_1=1} \prod_{i=1}^{N} \exp\left(-\frac{\left|r_i - \sum_{j=1}^{M} h_{ij} s_j\right|^2}{\sigma^2}\right)}{\sum_{\vec{s}=f(\vec{b}), b_1=0} \prod_{i=1}^{N} \exp\left(-\frac{\left|r_i - \sum_{j=1}^{M} h_{ij} s_j\right|^2}{\sigma^2}\right)},$$

Equation 13 where $\sigma^2$ denotes the noise power per receive antenna 40. Since it is impractical to calculate equation 13 directly in implementations, a max-log may be used to simplify equation 13 to:

$$\Lambda(b_1) = \min_{\vec{s}=f(\vec{b}), b=0} \sum_{i=1}^{N} \frac{\left|r_i - \sum_{j=1}^{M} h_{ij} s_j\right|^2}{\sigma^2} - \min_{\vec{s}=f(\vec{b}), b=1} \sum_{i=1}^{N} \frac{\left|r_i - \sum_{j=1}^{M} h_{ij} s_j\right|^2}{\sigma^2}.$$

Equation 14

Assuming that noise power $\sigma^2$ is a constant within the Turbo code block, then equation 14 can be further simplified to:

$$\Lambda(b_1) = \min_{\vec{s}=f(\vec{b}), b=0} \sum_{i=1}^{N} \left|r_i - \sum_{j=1}^{M} h_{ij} s_j\right|^2 - \min_{\vec{s}=f(\vec{b}), b=1} \sum_{i=1}^{N} \left|r_i - \sum_{j=1}^{M} h_{ij} s_j\right|^2.$$

Equation 15

Equation 15 is used to compute MLD soft-demapping values and is implemented in the STC decoder 78.

One step that every demapping algorithm has to perform is to search for an estimated signal vector, $\hat{\vec{s}}$, that is closest to the received signal. This step is hard-decision decoding, and can be expressed as:

$$\hat{\vec{s}} = \arg \min_{\vec{s}} \sum_{i=1}^{N} \left|r_i - \sum_{j=1}^{M} h_{ij} s_j\right|^2.$$

Equation 16

Every soft-demapped bit will carry the sign that is determined by equation 16. The question is how to assign a soft value for each bit. For hard-decision decoding, a set of hard decision values for every possible symbol vector $\vec{s}$ is calculated as follows:

$$\left\{ \sum_{i=1}^{N} \left| r_i - \sum_{j=1}^{M} h_{ij} s_j \right|^2 \right\}. \qquad \text{Equation 17}$$

After the first search according to equation 16, either the first or the second term of equation 15 is obtained. If b1 corresponding to the solution is 1, a search for the first term of equation 15 is done to get the soft value that is provided. If b1 corresponding to the solution is 0, a search for the second term of equation 15 to get the soft value is provided. In practice, it is this searching for competing symbols that is potentially time consuming.

Let:

$$d_1^2 \leq d_2^2 \leq \ldots \leq d_L^2 \qquad \text{Equation 18}$$

be the Euclidean distances $$d_k^2 = \sum_{i=1}^{N} \left| r_i - \sum_{j=1}^{M} h_{ij} s_j \right|^2$$

corresponding to symbol vector $\vec{s}_k$, and let:

$$d_1^2 = \min_{\vec{s}} \sum_{i=1}^{N} \left| r_i - \sum_{j=1}^{M} h_{ij} s_j \right|^2. \qquad \text{Equation 19}$$

Figure 7:
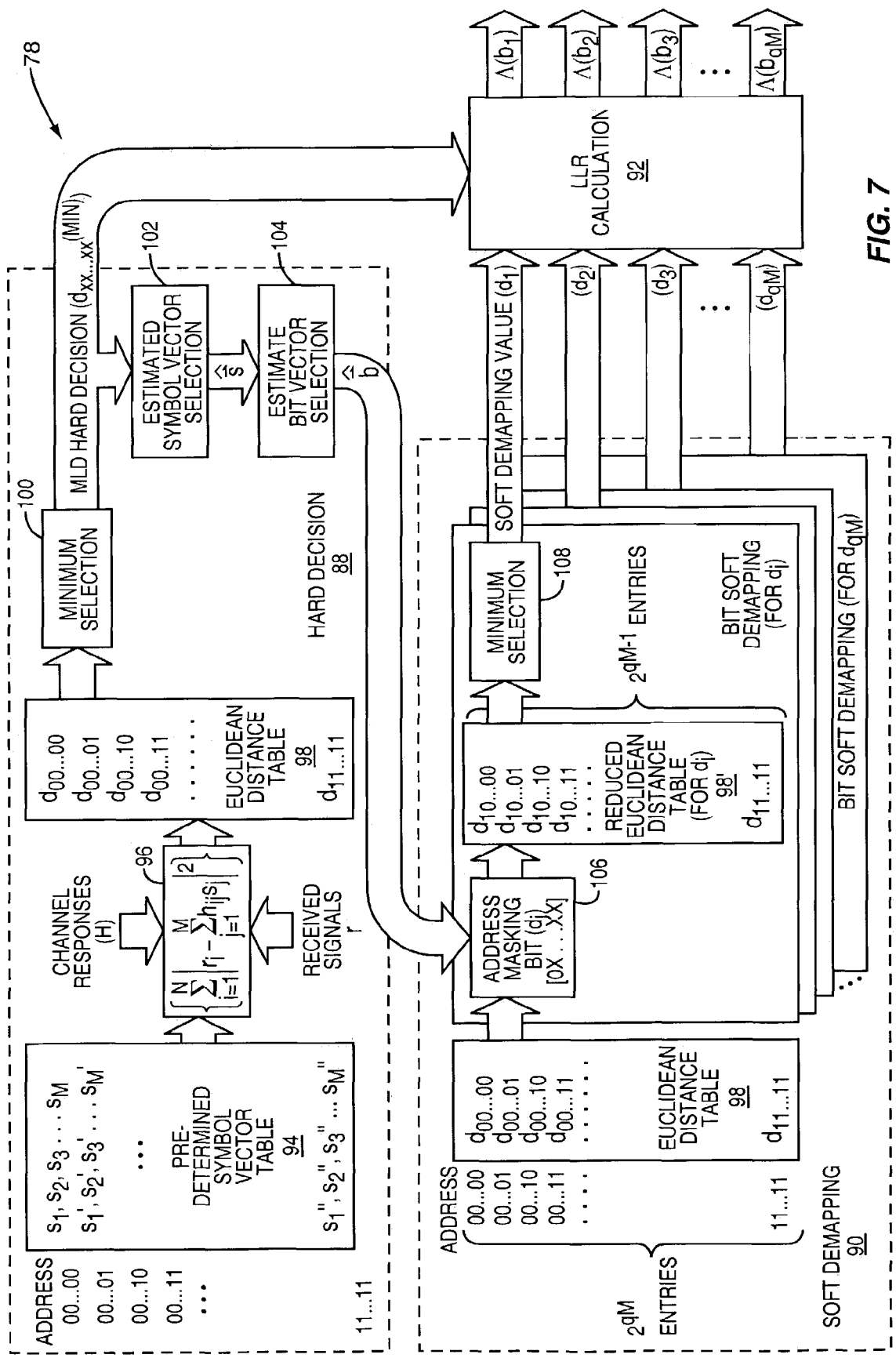
FIG. 7 is a block representation of the decoding process according to one embodiment of the present invention.

In the preferred embodiment as illustrated in FIG. 7, the STC decoder 78 has three primary functions: a hard decision function 88, a soft demapping function 90, and an LLR calculation function 92. Initially, a predetermined symbol vector table 94 is generated, and will include potential symbol vectors $\vec{s}$ that can be transmitted from the receiver. In essence, each symbol vector $\vec{s}$ is associated with a unique combination of symbols, $s_i$, which may be simultaneously transmitted from the transmitter's antennas 28. In essence, the predetermined symbol vector table 94 provides all or a portion of the potential symbol combinations that may be transmitted from the transmitter, wherein each combination is stored as a symbol vector, $\vec{s}$.

The hard decision function 88 primarily includes a Euclidean distance calculation function 96, which essentially determines the Euclidean distance between the received signals r and the symbol vectors $\vec{s}$, from the predetermined symbol vector table 94 in light of the corresponding channel responses, H. In a preferred embodiment, the Euclidean distances corresponding to each symbol vector in the predetermined symbol vector table 94 (or a set thereof) are calculated based on equation 15, and the resultant Euclidean distances are stored in a Euclidean distance table 98. The Euclidean distances, $d_{xx \ldots xx}$, are stored in the Euclidean distance table 98 in a manner in which the associated symbol vector from the predetermined symbol vector table 94 can be readily determined.

Once the Euclidean distance table 98 has been created for the particular segment of the received signal r, a minimum selection function 100 compares each of the Euclidean distances $d_{xx \ldots xx}$ in the Euclidean distance table 98 and selects the smallest Euclidean distance, which is referred to as a hard decision or MLD hard decision, $d_{xx \ldots xx}^{MIN}$. The MLD hard decision will serve as either the first or second term of Equation 15, which is restated below for convenience:

$$\Lambda(b_1) = \min_{\vec{s}=f(\vec{b}), b=0} \sum_{i=1}^{N} \left| r_i - \sum_{j=1}^{M} h_{ij} s_j \right|^2 - \qquad \text{Equation 15}$$

$$\min_{\vec{s}=f(\vec{b}), b=1} \sum_{i=1}^{N} \left| r_i - \sum_{j=1}^{M} h_{ij} s_j \right|^2.$$

Notably, the MLD hard decision $d_{xx \ldots xx}^{MIN}$ is used in the calculation for each of the LLRs corresponding to the decoded bits.

The MLD hard decision $d_{xx \ldots xx}^{MIN}$ is also used to select an estimated symbol vector ($\vec{s}$) from the corresponding predetermined symbol vector table 94 (function 102). The estimated symbol vector is the symbol vector from the predetermined symbol vector table 94 from which the MLD hard decision was calculated. From the estimated symbol vector, an estimated bit vector ($\vec{b}$) is selected or otherwise determined (function 104).

The bit vector $\vec{b}$ is provided to the soft demapping function 90, and in particular, to an address masking function 106. The soft demapping function 90 provides separate processing for each bit in the bit vector. For each bit, a soft demapping solution $d_i$ is generated, wherein the soft demapping solution $d_i$ corresponds to a minimum Euclidean distance associated with a competing bit. Accordingly, the address masking function 106 will provide the following operation for each bit in the bit vector. For the respective bit, the address masking function 106 creates a reduced Euclidean distance table 98' from the Euclidean distance table 98. The entries in the reduced Euclidean distance table 98' represent those entries in the Euclidean distance table 98 that are associated with a bit opposite that in the bit vector (competing bit). As such, the Euclidean distances in the reduced Euclidean distance table 98' represent Euclidean distances associated with a competing bit associated with the MLD hard decision. Thus, if the first bit in the bit vector is a 0, the distances selected from the Euclidean distance table 98 will be those where the first bit associated with the Euclidean distances is a 1. From the reduced Euclidean distance table 98', another minimum selection function 108 can select the smallest Euclidean distance associated with the competing bit, and provide that soft demapping decision, $d_j$, to the LLR calculation function 92. Notably, the soft demapping function 90 will provide soft demapping decisions associated with each bit in the bit vector to the LLR calculation function 92.

The LLR calculation function 92 will use the MLD hard decision and each of the soft demapping decisions for each of the bits in the bit vector to calculate an LLR ($\Lambda b_i$) for each bit in the bit vector. These calculations are accomplished by essentially allowing the greater of the MLD hard decision or the corresponding soft demapping decision $d_i$ to be the first term in equation 15 and subtracting therefrom the smaller of the MLD hard decision or the corresponding soft demapping decision to generate the LLR for the particular bit. The LLR for each bit is then provided to the Turbo decoder 80 as described above to recover and decode the originally transmitted bits, $b_1$-$b_4$. With the above MLD process, the predetermined symbol vector table 94 can be preconfigured based on the transmission configuration, and the Euclidean distance table 98 will be reconstructed for each portion of the received signal r being processed. For soft demapping, the reduced Euclidean distance table 98' established for each bit being processed in the particular portion of the received signal is reduced by at least half of the Euclidean distance table 98, which significantly reduces the amount of processing required to arrive at the soft demapping decisions, which are provided to the LLR calculation function 92.

An optional aspect of the present invention further reduces the complexity associated with MLD decoding With respect to the transmit modulation by setting it to a fixed value, which is invariant to the QAM size. Further, the MLD decoding complexity becomes linear, instead of exponential, to the number of transmit antennas 28. In general, the decoding technique involves the following. First, a separate detection technique, such as ZF or MMSE, is used to determine initial decoding solutions corresponding to the symbols transmitted from each of a number of transmit antennas at a given time. For each initial solution, a limited area about the initial solution is defined. Each of the limited areas will correspond to regions including constellation points proximate the initial solution. The initial solutions are used to define a limited, multi-dimensional space. Accordingly, the initial solutions are used to reduce the search complexity associated with joint decoding by defining a limited space about the initial solutions. Finally, a joint decoding technique, such as MLD described above, is implemented within the limited space to find a final solution. In a further refinement of the present invention, the initial solutions may be derived from signals corresponding to only select transmit antennas, wherein successive MLD solutions are used to find the final, MLD solution to provide interference cancellation and reduce processing complexity. The reductions in the space for MLD result in a smaller Euclidean distance table 98, and an even smaller reduced Euclidean distance table, 98'.

Figure 8A:
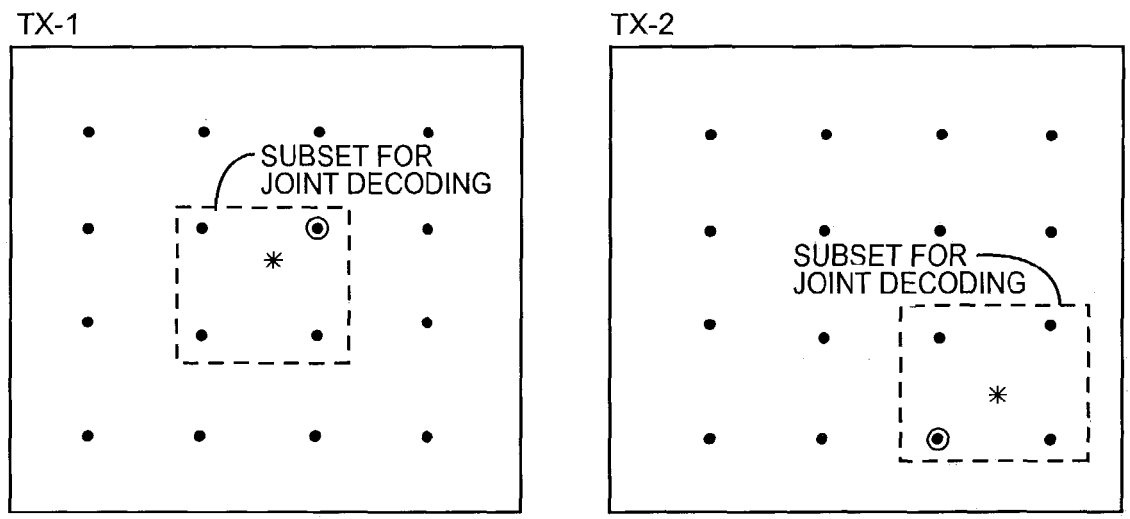
FIGS. 8A and 8B are constellation lattices from a transmitter and receiver's perspective and illustrate operation of the present invention.
Figure 8B:
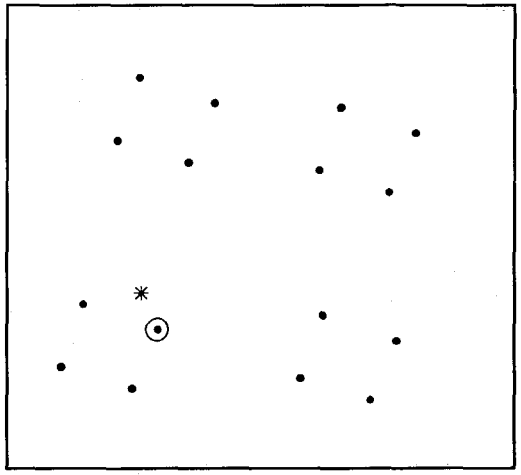
Figure 8B:
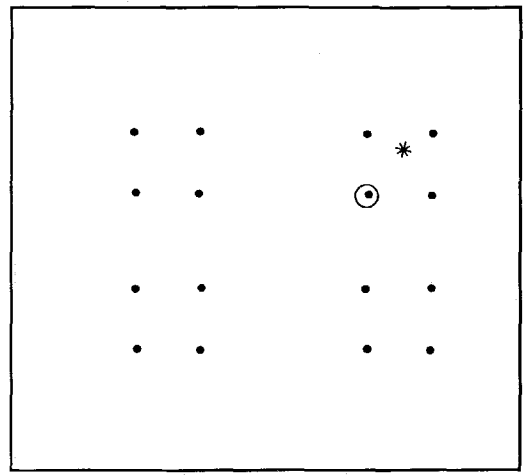
Figure 8B:
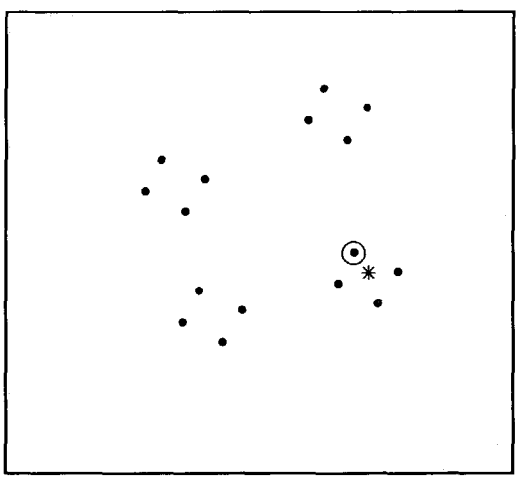
Figure 8B:
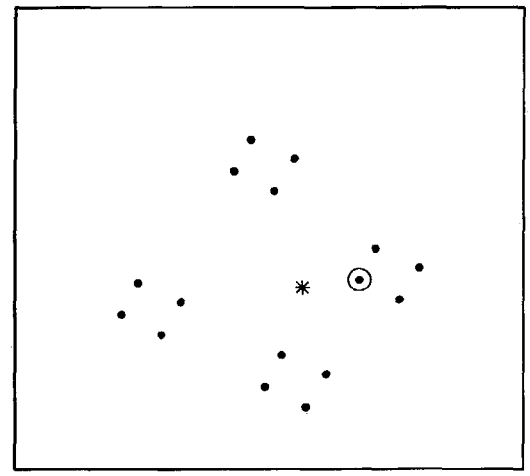

The basic concepts of a fast V-BLAST MLD decoder are illustrated in FIGS. 8A and 8B. For the purpose of illustration, assume the transmit modulation is 16 QAM, and the MIMO configuration is two transmit antennas (M=2) and four receive antennas (N=4). Accordingly, there are 16 constellation points for basic 16 QAM modulation. Since there are two transmit antennas, the total possible points at the receiver is represented by $Q^M$, where Q is the modulation order and M is the number of transmit antennas. In this example, the total number of possible points at the receiver is 256 ($16^2$).

With particular reference to FIG. 8A, constellations from the perspective of each of the two transmit antennas are illustrated. Each constellation has 16 possible points, wherein the circled point represents the actual symbol being transmitted from the particular antenna. For reference, a ZF solution associated with the transmitted symbol is mapped onto the transmission constellation to illustrate the effect of the channel conditions on the transmitted symbol. As illustrated, the channel conditions may impact the transmitted symbol sufficiently, where the ZF solution may not be most proximate to the actual constellation point corresponding to the symbol transmitted.

Accordingly, the ZF function is used to map the received symbol back to a point on the transmit constellation lattice for each receive antenna. This provides the initial solutions corresponding to symbols transmitted from each transmit antenna. The initial solutions act as rough estimates of the received symbols. The initial solutions are then used to identify or determine search areas, which are smaller regions within the transmit constellation matrix, highlighted with dashed boxes and associated with a limited set of candidate constellation points. The smaller regions determined based on the initial solutions define a limited, multi-dimensional space in which to implement MLD decoding. The limited space from the perspective of each receive antenna is illustrated in FIG. 8B. Within the limited space illustrated for each of the four receive antennas, there are 16 points, which correspond to the four points within the limited space from each of the two transmit antennas. Thus, the number of points illustrated in the limited space is $4^2$, or 16. The asterisk represents the combination of symbols transmitted from the two transmit antennas as received at each of the four receive antennas. The circled constellation point represents the combination of the transmitted symbols.

As noted, MLD decoding is provided only for the limited space determined based on the ZF solutions, instead of throughout the entire constellation lattice as provided in FIG. 8A. As such, only the Euclidean distances associated with the limited space are stored in the Euclidean distance table 98. The result of the MLD decoding will provide hard-decisions for the symbols transmitted from each of the transmit antennas. In one embodiment, the initial solutions are correlated with the nearest four constellation points based on the Euclidean distances. Using ZF or MMSE solutions to reduce the MLD decoding search set significantly reduces processing complexity by reducing the space in which MLD decoding would otherwise be required. The limited space determined based on the initial ZF solutions may correspond to any number of possible points in the constellation lattice or area therein. Accordingly, the limited area for MLD decoding can be significantly reduced, thus reducing the complexity of MLD. In the example provided, the present invention reduces the required MLD from an original constellation of 16 points to one of four points within the larger constellation (as shown in FIG. 8A). Thus, the number of points for MLD processing is reduced in a two-transmitter system from $16^2$=256 to $4^2$=16 points. Tests have shown that limiting MLD decoding to such a reduced set of constellation points as small as four can be done without performance loss.

A process flow is next described for carrying out an enhanced embodiment of the present invention wherein MLD decoding is iteratively carried out for groups of transmit antennas instead of for every transmit antenna at one time. Although the groups can be any size, the exemplary implementation operates on groups of two antennas. In this example, assume that there are four transmit antennas. In general, initial (ZF or MMSE) solutions are determined for each transmit antenna and used to group the transmit antennas into groups based on signal strength. In this example of four transmit antennas, there are two groups of two antennas. Next, the initial solutions for the weaker group are subtracted from the stronger group to form modified initial solutions. For each modified initial solution, a limited area about the modified initial solution is defined. Each of the limited areas will correspond to regions including constellation points proximate the modified initial solution. The initial solutions are used to define a limited, multi-dimensional space. An MLD joint decoding technique is implemented within the limited space to find a final solution for the strongest pair of transmit antennas. These final solutions are then multiplied by the corresponding channel matrix to provide a modified signal, which is subtracted from the received signal. The resulting signal should represent the signals transmitted from the next, and final (or weaker) in the example, pair of transmit antennas.

Figure 9:
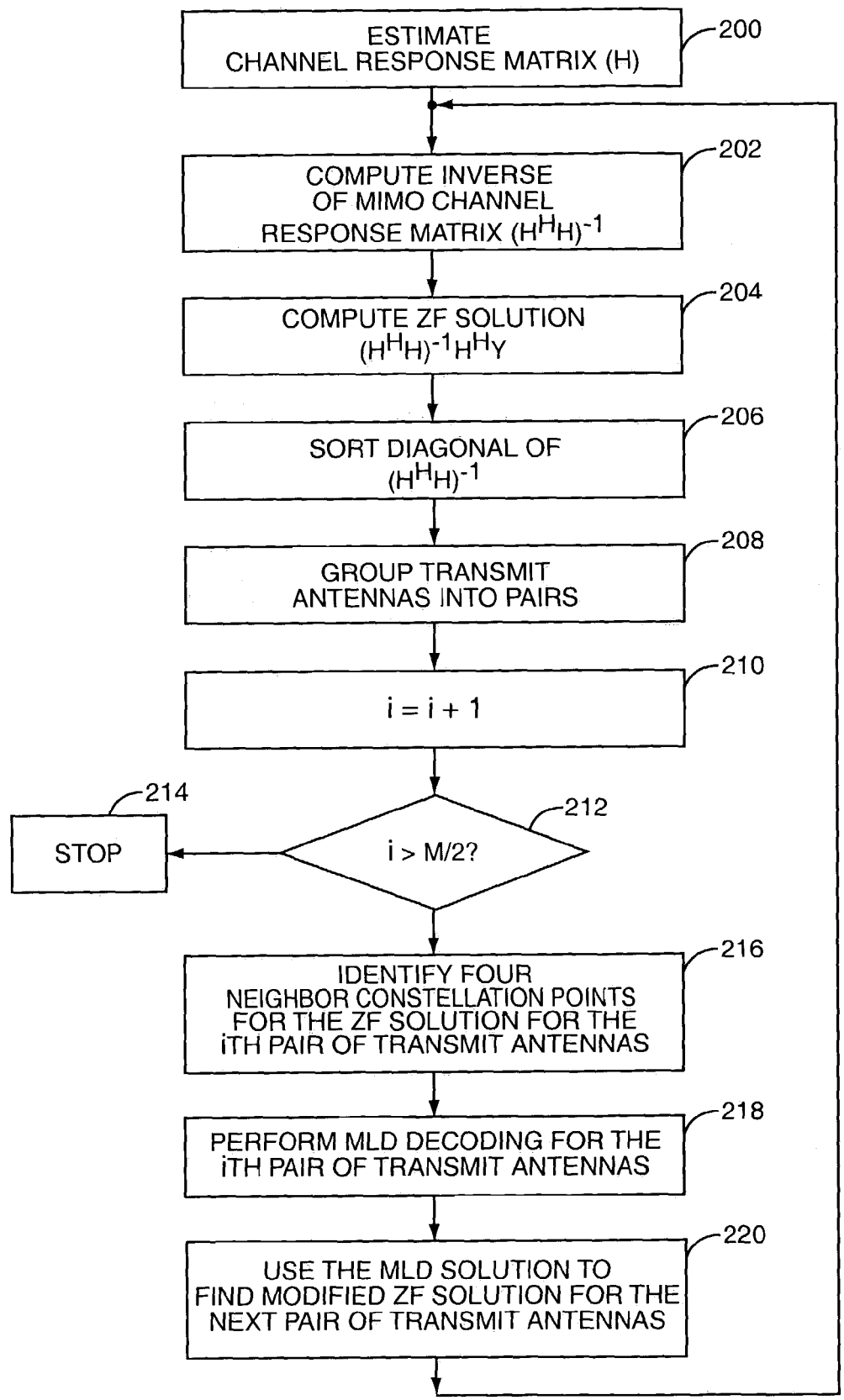
FIG. 9 is a flow diagram illustrating operation of one embodiment of the present invention.

A more detailed process flow for the latter embodiment is illustrated in FIG. 9. Accordingly, the channel response matrix H is first determined (block 200). Next, the inverse of the channel response matrix is calculated (block 202) to determine the ZF (or MMSE) initial solutions, preferably using the Moore-Penrose pseudoinverse of the channel response matrix (block 204). The order in which to apply MLD decoding can be determined by sorting the norm of columns of the pseudoinverse of the channel response matrix H (block 206). In this embodiment, the ordering is used to group the transmit antennas into pairs of antennas for MLD decoding (block 208), preferably based on signal strength.

Next, MLD decoding is applied for each transmit antenna pair. Initially, a variable i is set equal to i+1 (block 210). If i is greater than the number of pairs of transmit antennas, i>M/2 (block 212), the process is stopped (block 214). Otherwise, a defined number, such as four, of the closest or neighboring constellation points in the transmission constellation lattice for the ZF (or MMSE) function are identified for the ith pair of antennas (block 216). MLD decoding is then performed about the identified constellation points for the Ith pair of transmit antennas to arrive at a final (MLD) solution (block 218). The final (MLD) solution in light of the channel conditions is then subtracted from the received signal to arrive at modified initial (ZF) solutions for the next pair of antennas (block 220). The process will repeat until a final (MLD) solution is provided for each pair of antennas. Notably, the group size may change from iteration to iteration. The advantages of the proposed approach follow. First, the MLD decoding complexity is independent of QAM modulation size. In the above example, the MLD searching range is reduced to the vicinity of four constellation points and the Euclidean distance table 98 will have Euclidean distances only from the MLD searching range. Further, the MLD decoding may only apply to transmit antenna pairs and is a conditional MLD search based on the tentative solution of zero-forcing.

Those skilled in the art will recognize improvements and modifications to the preferred embodiments of the present invention. All such improvements and modifications are considered within the scope of the concepts disclosed herein and the claims that follow.

What is claimed is:

1. A method comprising:
    a) providing a symbol vector table comprising symbol vectors corresponding to potential combinations of transmitted symbols;
    b) determining first Euclidean distances between a received signal and a plurality of the symbol vectors in light of corresponding channel responses;
    c) selecting a first smallest distance from the first Euclidean distances as a hard decision;
    d) determining a bit vector corresponding to the first smallest distance; and
    e) for each bit in the bit vector:
        i) selecting second Euclidean distances corresponding to a competing bit from the first Euclidean distances; and
        ii) selecting a competing smallest distance from the second Euclidean distances as a soft demapping value.

2. The method of claim 1 wherein for each bit in the bit vector, further comprising determining a difference between the hard decision and the corresponding soft demapping value.

3. The method of claim 2 wherein the difference is a log likelihood ratio.

4. The method of claim 2 further comprising decoding the differences for each bit using channel decoding to recover transmitted bits.

5. The method of claim 1 wherein the first Euclidean distances are calculated using:

$$\left\{ \sum_{i=1}^{N} \left| r_i - \sum_{j=1}^{M} h_{ij} s_j \right|^2 \right\},$$

such that r is the received signal, $s_i$ is a symbol vector, $h_{ij}$ is a channel response vector, N is a number of receiver antennas, and M is a number of transmitter antennas.

6. The method of claim 5 wherein the channel decoding is Turbo decoding.

7. The method of claim 1 wherein the bit vector is determined by identifying one of the symbol vectors corresponding to the hard decision and selecting the bit vector based on the one of the symbol vectors.

8. The method of claim 1 further comprising creating a Euclidean distance table comprising the first Euclidean distances and creating a plurality of reduced Euclidean distance tables comprising the second Euclidean distances, wherein the first smallest distance is selected from the Euclidean distance table and the competing smallest distances for each bit are selected from corresponding ones of the reduced Euclidean distance tables.

9. The method of claim 1 further comprising:
    a) decoding the received signal, which originates from a plurality of transmit antennas, using a separate STC decoding technique to determine a plurality of initial solutions;
    b) identifying a limited area about each of the initial solutions; and
    c) creating a decoding space corresponding to the limited area,
wherein the first Euclidean distances are determined from within the limited area.

10. The method of claim 9 wherein the limited area corresponds to a limited set of constellation points in a constellation lattice containing constellation points corresponding to possible symbols transmitted from the plurality of transmit antennas.

11. The method of claim 9 wherein the limited area corresponds to a set of four constellation points in a constellation lattice containing constellation points corresponding to possible symbols transmitted from the plurality of transmit antennas.

12. The method of claim 9 wherein the decoding space is a limited space in a multi-dimensional constellation lattice corresponding to a limited set of constellation points.

13. The method of claim 9 wherein there is an initial solution for each of the plurality of transmit antennas.

14. The method of claim 9 wherein the separate STC decoding technique is zero-forcing.

15. The method of claim 9 wherein the separate STC decoding technique is minimum mean square error decoding.

16. A system for receiving signals comprising:
    A) an antenna;
    B) RF circuitry for demodulating and amplifying the received signal;

C) analog-to-digital converter for receiving the output of the RF circuitry; and D) decoder circuitry for receiving the output of the analog-to-digital converter, the decoder circuitry for:
a) providing a symbol vector table comprising symbol vectors corresponding to potential combinations of transmitted symbols;
b) determining first Euclidean distances between a received signal and a plurality of the symbol vectors in light of corresponding channel responses;
c) selecting a first smallest distance from the first Euclidean distances as a hard decision;
d) determining a bit vector corresponding to the first smallest distance; and
e) for each bit in the bit vector:
 i) selecting second Euclidean distances corresponding to a competing bit from the first Euclidean distances; and
 ii) selecting a competing smallest distance from the second Euclidean distances as a soft demapping value.

17. The system of claim 16 wherein for each bit in the bit vector, the decoding circuitry further determines a difference between the hard decision and the corresponding soft demapping value.

18. The system of claim 17 wherein the difference is a log likelihood ratio.

19. The system of claim 17 wherein the decoding circuitry further decodes the differences for each bit using channel decoding to recover transmitted bits.

20. The system of claim 16 wherein the first Euclidean distances are calculated using:

$$\left\{ \sum_{i=1}^{N} \left| r_i - \sum_{j=1}^{M} h_{ij} s_j \right|^2 \right\},$$

such that r is the received signal, $s_i$ is a symbol vector, $h_{ij}$ is a channel response vector, N is a number of receiver antennas, and M is a number of transmitter antennas.

21. The system of claim 20 wherein the channel-decoding is Turbo decoding.

22. The system of claim 16 wherein to determine the bit vector, the decoding circuitry further identifies one of the symbol vectors corresponding to the hard decision and selects the bit vector based on the one of the symbol vectors.

23. The system of claim 16 wherein the decoding circuitry further creates a Euclidean distance table comprising the first Euclidean distances and creates a plurality of reduced Euclidean distance tables comprising the second Euclidean distances, wherein the first smallest distance is selected from the Euclidean distance table and the competing smallest distances for each bit are selected from corresponding ones of the reduced Euclidean distance tables.

24. The system of claim 16 wherein the decoding circuitry further:
a) decodes the received signal, which originates from a plurality of transmit antennas, using a separate STC decoding technique to determine a plurality of initial solutions;
b) identifies a limited area about each of the initial solutions; and
c) creates a decoding space corresponding to the limited area,
wherein the first Euclidean distances are determined from within the limited area.

25. The system of claim 24 wherein the limited area corresponds to a limited set of constellation points in a constellation lattice containing constellation points corresponding to possible symbols transmitted from the plurality of transmit antennas.

26. The system of claim 24 wherein the limited area corresponds to a set of four constellation points in a constellation lattice-containing constellation points corresponding to possible symbols transmitted from the plurality of transmit antennas.

27. The system of claim 24 wherein the decoding space is a limited space in a multi-dimensional constellation lattice corresponding to a limited set of constellation points.

28. The system of claim 24 wherein there is an initial solution for each of the plurality of transmit antennas.

29. The system of claim 24 wherein the separate STC decoding technique is zero-forcing.

30. The system of claim 24 wherein the separate STC decoding technique is minimum mean square error decoding.

31. A method comprising:
a) determining first terms associated with differences between a received signal and a plurality of symbol vectors in light of corresponding channel responses, the symbol vectors corresponding to potential combinations of transmitted symbols;
b) selecting a first smallest term from the first terms as a hard decision;
c) determining bits corresponding to the first smallest term; and
d) for each bit of the bits:
 i. selecting second terms corresponding to a competing bit from the first terms; and
 ii. selecting a competing smallest term from the second terms as a soft demapping value.

32. The method of claim 31 wherein for each bit, further comprising determining a difference between the hard decision and the corresponding soft demapping value.

33. The method of claim 32 wherein the difference is a log likelihood ratio.

34. The method of claim 32 further comprising decoding the differences for each bit using channel decoding to recover transmitted bits.

35. The method of claim 31 wherein the first and second terms are Euclidean distances.

36. The method of claim 31 wherein the first terms are calculated using:

$$\left\{ \sum_{i=1}^{N} \left| r_i - \sum_{j=1}^{M} h_{ij} s_j \right|^2 \right\}.$$

* * * * *